Sept. 30, 1947.  A. O. WOOD  2,428,303
INDUCTION HEATING MEANS FOR GEAR TEETH
Filed Feb. 24, 1943   2 Sheets-Sheet 1
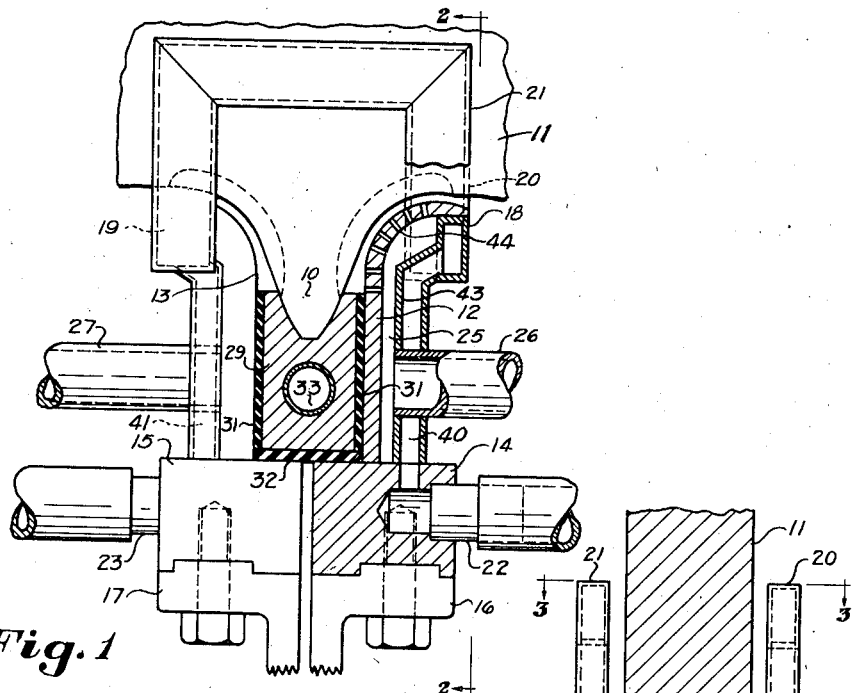
Fig. 1
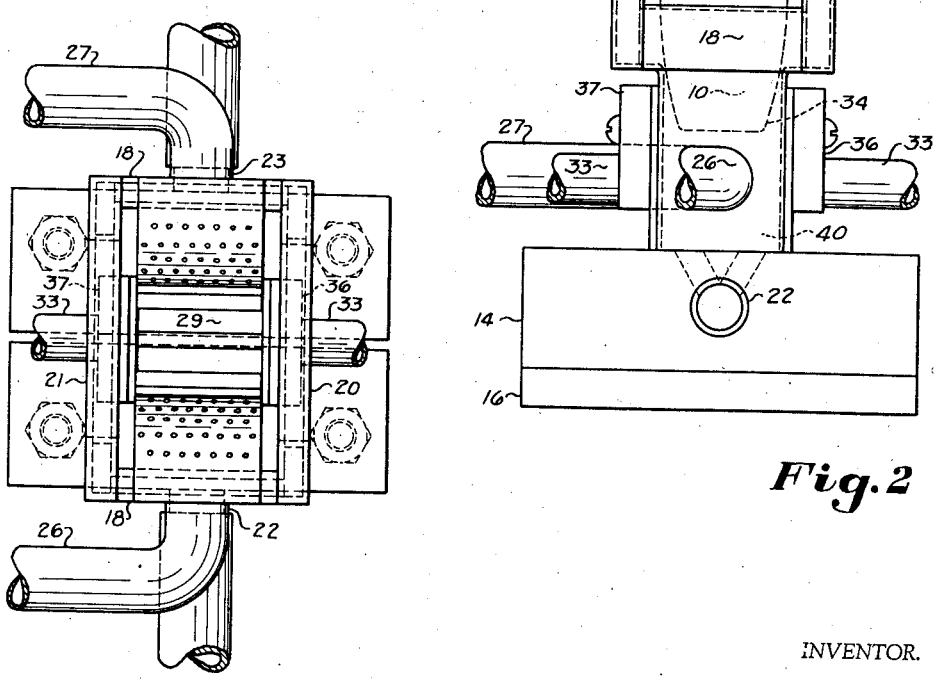
Fig. 2
Fig. 3
INVENTOR.
Alden O Wood

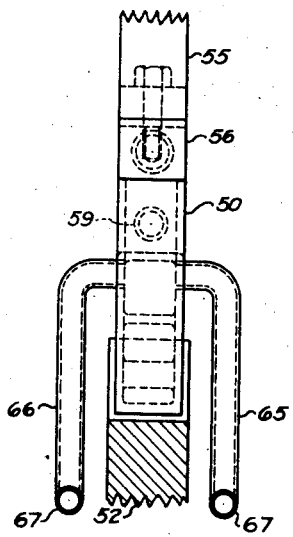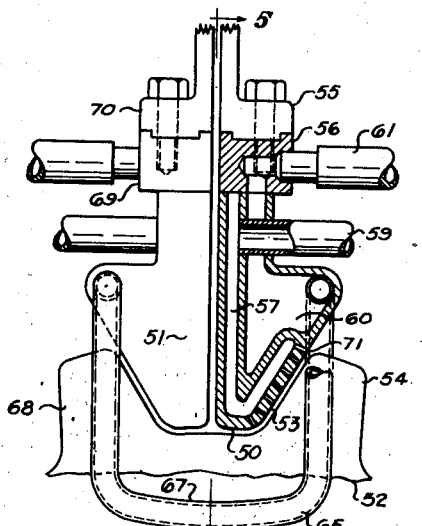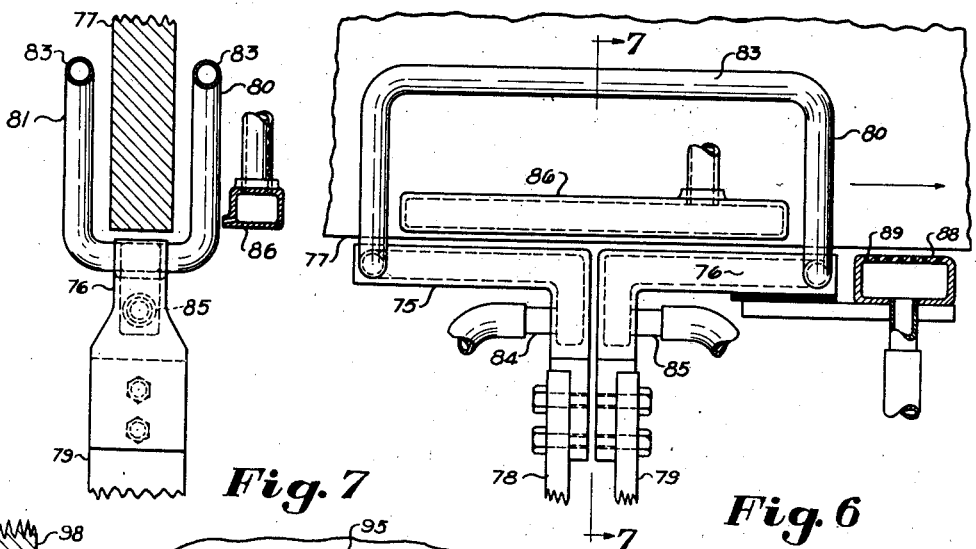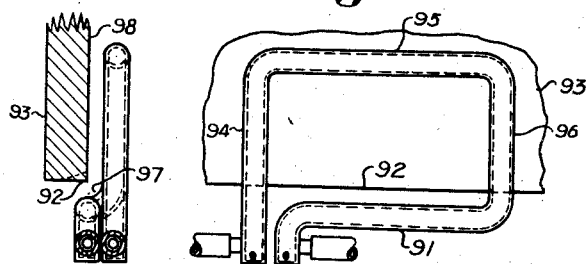

Patented Sept. 30, 1947

2,428,303

UNITED STATES PATENT OFFICE 2,428,303

INDUCTION HEATING MEANS FOR GEAR TEETH

Alden O. Wood, Parma, Ohio, assignor to The Ohio Crankshaft Company, Cleveland, Ohio, a corporation of Ohio Application February 24, 1943, Serial No. 476,989

3 Claims. (Cl. 219—13)

The present invention relates to means for inductively heating, and is directed primarily to heating various edges and projections such as the edges of plates and the teeth of gears and sprockets for tempering, for hardening or for other purposes. Heretofore, it has been difficult to sufficiently confine heating to the particular region or regions which it was desired to heat without harmfully heating other parts adjacent thereto and without a considerable waste of power. Frequently, it is necessary to heat intermediate parts of such articles as sprocket or gear teeth by confining heating to regions at the pitch line and without heating the tops or root sections. Further, quenching to harden after heating is required in many cases.

The chief object of the present invention has been to provide means to heat pitch line regions of teeth while maintaining temperature in the tops of the teeth at a relatively low level. Another object has been to harden selected faces of metallic teeth individually. A further object has been to temper an edge surface zone of a plate or similar article. A still further object has been to harden such edge surface zone of a metallic article to provide a cutting edge or corner such as a cutting edge of a die. Other objects will become apparent from the following description and appended claims.

With the above and other objects in view, the said invention then consists of the apparatus herein described. Preferred forms of the apparatus are shown in the annexed drawings in which:

Fig. 1 is a view partly in section showing one form of the apparatus as applied for hardening flank areas on opposite sides of a sprocket tooth.

Fig. 2 is a section substantially at 2—2 of Fig. 1.

Fig. 3 is a plan view as indicated at 3—3 of Fig. 2.

Fig. 4 is a view partly in section showing another form of the apparatus as applied for hardening adjacent sides of adjacent sprocket teeth.

Fig. 5 is a section at 5—5 of Fig. 4.

Fig. 6 is a plan view showing another form of the apparatus as applied to an end surface and edges of a plate.

Fig. 7 is a section as indicated at 7—7 of Fig. 6.

Fig. 8 is a plan view showing an inductor comprising a modified form of approximately half of the inductor of Fig. 6.

Fig. 9 is an elevation of the inductor of Fig. 8.

In general the invention comprises an inductor having two branches, each branch being adapted to extend along one or more surfaces to be heated and having one or more conductors connecting opposite or remote ends of the two branches to complete a circuit for current supplied to adjacent ends of the two branches.

In the form of the apparatus illustrated in Figs. 1, 2, and 3 the tooth 10 of sprocket 11 is shown in position to be hardened by an inductor comprising the two members 12 and 13 fused to terminals 14 and 15 which terminals form the adjacent ends of these members. Current of suitable frequency is supplied to the terminals by leads 16 and 17. The opposite ends of the inductors at 18 and 19 are connected by the parallel conductors 20 and 21 lying on opposite sides of the sprocket 11 to complete the circuit from leads 16 and 17. Water for cooling the terminals 14 and 15 and conductors 20 and 21 is supplied from piping connections 22 and 23. Quenching fluid is supplied to quenching jackets 25 by valve controlled pipes 26 and 27. To eliminate or greatly reduce heating in the top of the tooth a contact block 29 usually of copper formed to closely fit the wearing surfaces of the tooth is applied to the top of the tooth which not only conducts heat away from the tooth, but shields the tooth from a major part of currents which would be induced in the tooth. This block is insulated from the inductors 12 and 13 and from terminals 14 and 15 by insulation at 31 and 32. To maintain an effective gradient for a flow of heat from the tooth into block 29, this block is effectively cooled by fluid circulating through piping 33 which is inserted in this block.

To further control heating, particularly to prevent excessive temperatures building up in the edges at the ends of the teeth as at 34 of Fig. 2, copper plates 36 and 37 are provided. These plates are secured to the ends of block 29 and are cooled by fluid flowing in piping 33 which piping passes through and is in contact with these plates. Current in inductors 12 and 13 induces current in plates 36 and 37 which induced current reacts to distort and cancel a part of the flux field which would otherwise thread through and generate heating current in the ends 34 of the teeth and harmfully heat edges at these tooth ends. By proportioning the parts substantially as shown, heat is correctly distributed in the tooth to provide heating of desired uniformity.

Passage 40 made of rectangular tubing receives cooling fluid through terminal 14 from pipe 22 and delivers it to one end of conductors 20 and 21 through which it passes into passage 41 also made of rectangular tubing which is attached through terminal 15 to pipe 23. A wall such as 43 of each of passages 40 and 41 serves as a wall of quenching fluid delivery chambers 25. It will be observed that each of the passages such as 40 is connected at its opposite ends to serve as a conductor in parallel with an adjacent inductor such as 12. The frequency of the current supplied to terminals 14 and 15 is sufficiently high to cause most of this current through proximity effect to follow the inductor and due to its proximity with the flank of the tooth 10 heats this flank rapidly to a desired temperature. When heating has been completed, quenching fluid, usually water, is delivered by one or more valves in pipes 26 and 27 to chamber 25 at a moderately high pressure from which it is delivered through passages 44 in the inductors and impinges against the heated surface zones of the tooth flanks.

In the form of apparatus shown in Figs. 4 and 5 the inductors 50 and 51 are so formed as to both lie between two adjacent teeth of the gear of sprocket 52, one surface of each inductor lying adjacent to a face of each of the adjacent teeth. Inductor 50 having surface 53 lying adjacent to and in spaced relation with a surface of tooth 54 is supplied with periodically varying current from lead 55 through terminal 56. This inductor has a quenching fluid jacket space 57 supplied with quenching fluid by a valve controlled pipe 59. The inductor has a cooling fluid jacket 60 through which cooling fluid from pipe 61 is circulated. Current from lead 55 after passing through inductor 50 and along the surface 53 divides and follows two substantially parallel conductors 65 and 66, each being bent substantially in the form of a U, the closed ends of the U such as 67 lying toward a central part of the gear or sprocket 52 and being substantially parallel with and spaced from opposite sides of this gear or sprocket. These conductors are connected to opposite parts of inductor 51 lying adjacent to a top part of adjacent tooth 68 through which inductor the current passes along a face of this adjacent tooth to terminal 69 and lead 70 to thus complete its series circuit through both inductors.

While current of sufficiently high frequency flowing in tooth adjacent parts of inductors 51 and 53 would induce current of heating density in the adjacent surface zones of teeth 54 and 68, the frequency of current generally employed would not be high enough to accomplish satisfactory heating without conductors 65 and 66 arranged substantially as shown. These conductors in combination with tooth adjacent parts of the inductors 51 and 53 provide a pair of current conducting loops which cause a flux field produced by current in the loops to penetrate the surface zones of the teeth to heat these zones to hardening temperature after which these surface zones are quenched by fluid projected onto the surfaces of these zones through passages 71 from the quenching fluid delivery space 57.

Frequently it is desired to heat a zone in an edge of a metallic plate or sheet for the purpose of welding, annealing, or hardening. Ordinarily a conductor placed in closely spaced parallel relation with the edge surface and supplied with current of suitable frequency will heat such zone edge, but such simple arrangement of the conductor results in a large amount of the resulting flux field being dispersed through and lost in surrounding space causing a low heating efficiency. To overcome this loss of flux the heating inductor is provided with return circuit conductors arranged substantially as shown diagrammatically in Figs. 6 and 7. The inductor proper comprises the two branches 75 and 76 extending in opposite directions along an edge surface 77 of the plate and being connected to terminals 78 and 79 respectively supplying high frequency current from a suitable source. The outer or extreme ends of these inductors are joined by two conductors 80 and 81 each conductor being bent in the form of a U, the conductors extending substantially parallel with each other on opposite sides of the plate 77, the closed end 83 of the U being at a substantial distance from the edge of the plate. Tubes 84 and 85 are connected to the inductors through or near the current supply terminals to circulate cooling fluid through the inductors and through the conductors 80 and 81. When the edge of the plate or sheet is so long that it cannot all be heated simultaneously, means is provided to move the plate in its own plane with the edge 77 parallel with the inductor branches 75 and 76 to accomplish the heating progressively.

When it is desired to harden a part of the plate, such as a corner to provide a cutting edge adapted to be sharpened for cutting material such as in the case of a die for cutting metal, the corner is quenched after heating to hardening temperature. When the hardening is confined to a limited portion, quenching fluid is delivered from a quenching fluid discharge chamber such as 86 and is directed against the part it is desired to harden. When an extended part of an edge surface zone must be hardened both heating and quenching are progressive and a quenching fluid discharge member such as 88 is provided and located so that in moving the plate in the direction of the arrow elements of this edge surface move past this member after these elements have reached critical temperature in passing the inductor. Discharge passages 89 of the correct size, number and location deliver the quenching fluid from the quenching fluid discharge member onto the part of the heated zone required to be hardened.

Figs. 8 and 9 show a modification of the species of Figs. 6 and 7 in which the heating apparatus is provided as a single loop conductor. The size 91 of the conductor extends along the corner edge 92 of the plate 93 and lies substantially parallel to it at the required distance thus forming the inductor element. The remaining part of the conductor forming the loop itself is indicated by the sides 94, 95 and 96. Side 96 is usually bent as indicated at 97 to keep the side 96 in correctly spaced relation with a corner of the edge as at 92 and to keep the loop approximately parallel with surface 98 of the plate 93. When the heating is to be confined to the immediate region of the corner at 92 without heating parts of the edge surface farther removed from this corner, the off-set is omitted, the entire loop then lying substantially in a plane or along the surface 98, the loop being curved or otherwise formed as may be desired or necessary to produce the required spaced relation of the loop and the adjacent plane or curved surface of the article. In some cases the loop is inclined at a small angle with the surface 98 of the plate to produce closer proximity with the corner than with the other parts of the article.

It will be observed from all of the three species shown, that the invention comprises in general a pair of inductors each having a surface adapted to lie in closely spaced relation with a surface zone of an article and extending away from a pair of current supply terminals, and generally in opposite directions, the ends of the inductors farthest removed from the supply terminals being connected by a pair of generally U-shaped conductors to complete a circuit for high frequency current through the inductors, the U-shaped conductors lying along and being spaced from opposite surfaces of the article, the last named surfaces in general being at right angles to the surface of the zone to be heated.

Although two substantially parallel U-shaped loops are usually employed, two are not always necessary, one loop being sufficient in some cases such as that illustrated in Figs. 8 and 9. In general, the surface containing the zone to be heated is the surface of a transverse face joining two lateral faces or surfaces which in the present illustrations are the opposite and parallel circular sides of the sprockets 11 and 52 of Figs. 1 and 5 respectively and the upper and lower surfaces of plates 77 and 98 in Figs. 6 and 8. It will be evident that the zone surface is not necessarily at right angles to the lateral faces, but may be at a substantial angle with these faces. Further, it is not necessary that the lateral faces be parallel, but these faces may form various angles with each other, diverging or converging in a direction away from the transverse face.

It will be understood that when the loop shaped conductor having its one terminal connected to one end of an inductor such as 76 of Fig. 5 and having its opposite terminal connected to a terminal of a source of inducing current such as 78, this last named connection may be made directly or may be made through other members such as inductor 75, without impairing the heating effect of inductor 76. This is true as to whether one or two conductors are used.

Other forms may be employed embodying the features of my invention instead of the ones herein explained, change being made as regards the means and the steps herein disclosed, provided the elements stated by any of the following claims or the equivalent of such stated elements be employed, whether produced by my preferred method or by others embodying steps equivalent to those stated in the following claims.

I therefore particularly point out and distinctly claim as my invention:

1. In apparatus for heating a tooth of a gear, the tooth having a top portion and a root portion, an inductor comprising a pair of substantially complementary conductors adapted to lie in closely spaced relation with opposite faces of said tooth, and a pair of connecting conductors joining the complementary conductors, the connecting conductors being spaced from each other to receive the gear there between and to lie along opposite sides of the gear inwardly, radially a substantial distance from the root portion of the gear tooth.

2. In apparatus for heating a tooth of a gear, the tooth having a top portion and a root portion, a heat transfer member adapted to contact with a surface of the top portion, an inductor comprising a pair of substantially complementary conductors adapted to lie in closely spaced relation with opposite faces of said tooth and along opposite parts of the heat transfer member, and a pair of connecting conductors joining the complementary conductors, the connecting conductors being spaced from each other to receive the gear therebetween and to lie along opposite sides of the gear inward radially a substantial distance from the root portion of the gear tooth.

3. In apparatus for heating teeth of a gear, each tooth having a top portion and a root portion, an inductor comprising a pair of substantially complementary conductors adapted to lie in closely spaced relation with opposite tooth faces, and a pair of connecting conductors joining the complementary conductors, the connecting conductors being spaced from each other to receive the gear therebetween and to lie along opposite sides of the gear inward radially a substantial distance from the root portion of a gear tooth.

ALDEN O. WOOD.

REFERENCES CITED

The following references are of record in the file of this patent:

UNITED STATES PATENTS

| Number | Name | Date |
| --- | --- | --- |
| 2,282,322 | Denneen et al. | May 12, 1942 |
| 2,356,150 | Denneen et al. | Aug. 22, 1944 |
| 2,052,010 | Bailey | Aug. 25, 1936 |
| 2,144,377 | Kennedy | Jan. 17, 1939 |
| 2,290,338 | Koehring | July 21, 1942 |

FOREIGN PATENTS

| Number | Country | Date |
| --- | --- | --- |
| 467,882 | Great Britain | June 24, 1937 |

OTHER REFERENCES

Chesnut, "Induction Heat is $I^2R$," Steel, Aug. 30, 1943, page 74.

Le Grand, "New Uses of Induction Heating," "American Machinist," Oct. 1, 1942, pages 1079 and 1080.

Babat, "Construction of Heating Coils for Induction Surface Hardening," "Heat Treating and Forging," Feb. 1941, pages 89 thru 92.